United States Patent [19]

Smith

[11] Patent Number: 4,674,415

[45] Date of Patent: Jun. 23, 1987

[54] WIRE PLANT STANDS AND TABLES

[76] Inventor: Raymond Smith, 3101 SW. 50th Ter., Ft. Lauderdale, Fla. 33314

[21] Appl. No.: 876,471

[22] Filed: Jun. 20, 1986

[51] Int. Cl.$^4$ ............................................. A47B 13/02
[52] U.S. Cl. .................................. 108/150; 248/188.7; 248/165
[58] Field of Search .................... 108/150; 297/440; 248/188.7, 165, 167; 24/459, 122.6

[56] References Cited

U.S. PATENT DOCUMENTS

| | | | |
|---|---|---|---|
| 375,847 | 1/1888 | Weeden | 248/165 |
| 2,218,583 | 10/1940 | Marthaler | 248/188.7 |
| 2,562,022 | 7/1951 | Duer | 248/188.7 |
| 3,312,438 | 4/1967 | Goetz et al. | 248/165 |
| 3,537,670 | 11/1970 | Dionne | 248/188.7 |
| 3,779,497 | 12/1973 | Webber | 248/165 |
| 4,319,729 | 3/1982 | Lo | 248/167 |

FOREIGN PATENT DOCUMENTS

| | | | |
|---|---|---|---|
| 445793 | 6/1927 | Fed. Rep. of Germany | 248/165 |
| 222733 | 10/1924 | United Kingdom | 248/188.7 |
| 868728 | 5/1961 | United Kingdom | 248/165 |

*Primary Examiner*—Peter A. Aschenbrenner
*Attorney, Agent, or Firm*—Joseph Zallen

[57] ABSTRACT

A support comprising generally a plurality of stiff wire or rod members in detachable combination with a sleeve and locking ring. Each wire or rod has a generally vertical intermediate portion, and is bent outwardly on its lower portion. The sleeve holds the lower bent portions in place so that they act as support legs which can have additional appendages on their feet. The upper portion of each wire rod member is likewise bent outwardly to accomodate the supporting structure such as a plant pan or table top. On the intermediate portions adjacent to the upper bent portions is a similar sleeve and locking ring.

5 Claims, 5 Drawing Figures

WIRE PLANT STANDS AND TABLES

BACKGROUND OF INVENTION

This invention relates to novel supports for plants, table tops and the like. In particular, it relates to such supports which are readily detachable and which can be stored compactly.

SUMMARY OF INVENTION

The invention comprises generally a plurality of stiff wire or rod members in detachable combination with a sleeve and locking ring. Each wire or rod disc has the required strength, has a generally vertical intermediate portion, and is bent outwardly on its lower portion. The disc holds the lower bent portions in place so that they act as support legs which can have additional appendages on their feet. The upper portion of each wire or rod member is likewise bent outwardly to accommodate the supporting structure such as a plant pan or table top. On the intermediate portions adjacent to the upper bent portions is a similar disc and locking ring.

The disc is characterized as having a plurality of longitudinal notches whose curvature is substantially identical to the curvature of the rod or wire member. The locking ring slides over the disc after the wires are in position so as to hold the members firmly in position.

The wires or rods may have different configurations both in the upper as well as the lower portions but usually comprise a generally vertical intermediate portion with outwardly bent upper and lower portions wherein a pair of sleeves and locking rings is used on the intermediate portion.

The surface to be supported, as for example a plant holder or patio table top, determined the dimensions and arrangement of the upper clasping or supporting portions of the wires and rods. Where a plant holder is involved, a common configuration is an outward bend and then an inward bend. With a table top, the configuration can be simply an outer bend or it can be differently bent to accommodate a table top having prepared notches or holes. Both the intermediate portion and the upper portion of the rods may be of a wide variety of styles or designs so as to provide a wide variety of products, e.g. portable bar, ash-tray, and drinking can.

SPECIFIC EXAMPLES OF INVENTION

Figure 1:
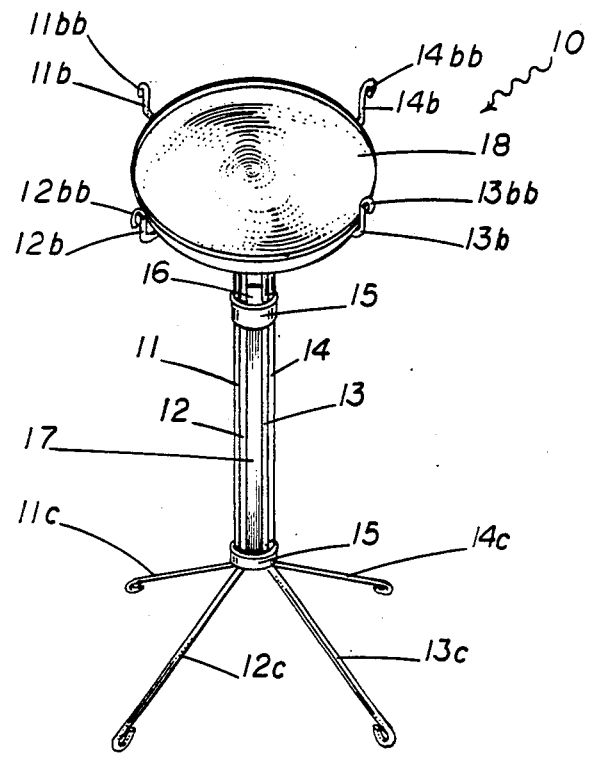
FIG. 1 is a perspective view of a plant holder in assembled condition.
Figure 2:
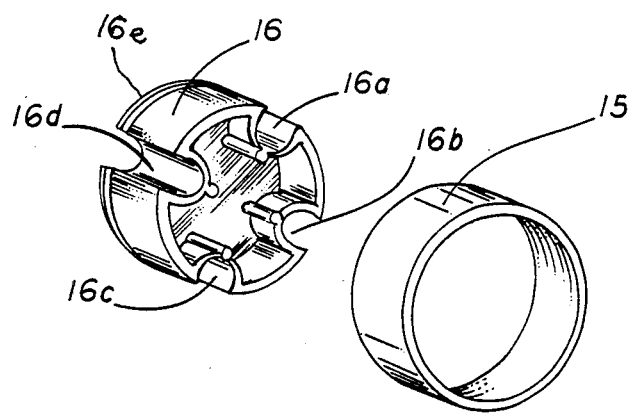
FIG. 2 is an exploded view of a sleeve and locking ring.
Figure 3:
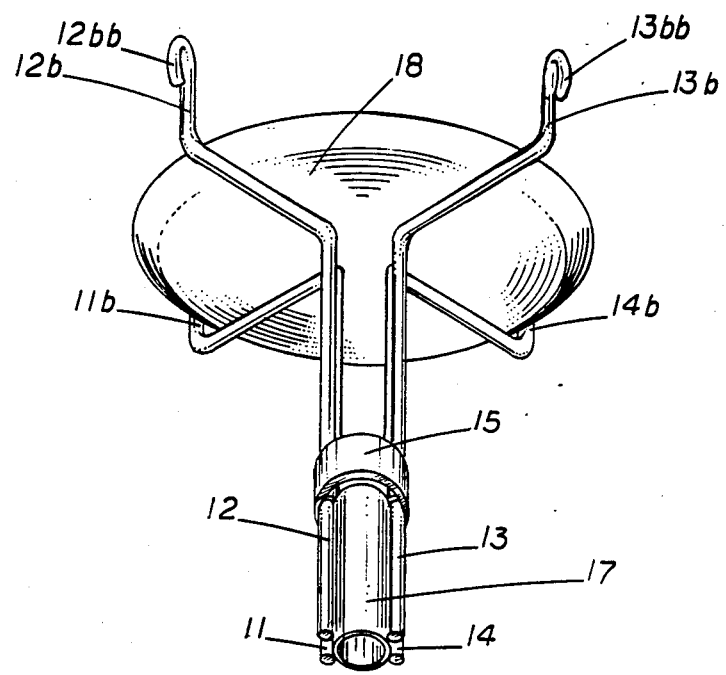
FIG. 3 is an underside view of the upper portion of FIG. 1 partially cut away.
Figure 4:
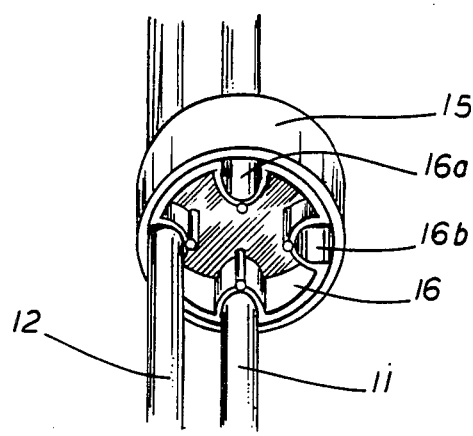
FIG. 4 is an enlarged partial view of the sleeve and locking ring of FIG. 3 wherein two of the rods and the stiffener have been removed.

Referring now to the drawings, the plant stand illustrated in FIGS. 1-4 comprises four identical bent steel rods 11, 12, 13, and 14 having outwardly bent lower portions 11c, 12c, 13c, and 14c, L-shaped upper portions 11b, 12b, 13b, and 14b terminating in bent over portions 11bb, 12bb, 13bb, and 14bb. The rods are covered with a coating of plastic of desired color.

The rods are held in position by two plastic sleeves 16 and locking rings 15, one where the lower portions join and one near the upper portions. Each sleeve 16 has longitudinal grooves 16a, 16b, 16c, and 16d of approximately hemispherical cross section so that the rods when inserted in the notches are tightly retained when the locking ring 15 is slid into position. End lip 16e acts as a stop to further movement of ring 15. In this example a plant holding pan 18 is held by the upper portions and a hollow cylindrical stiffener 17 is inserted between the rods for aesthetic reasons. The stiffener and rods can be of selected colors.

Figure 5:
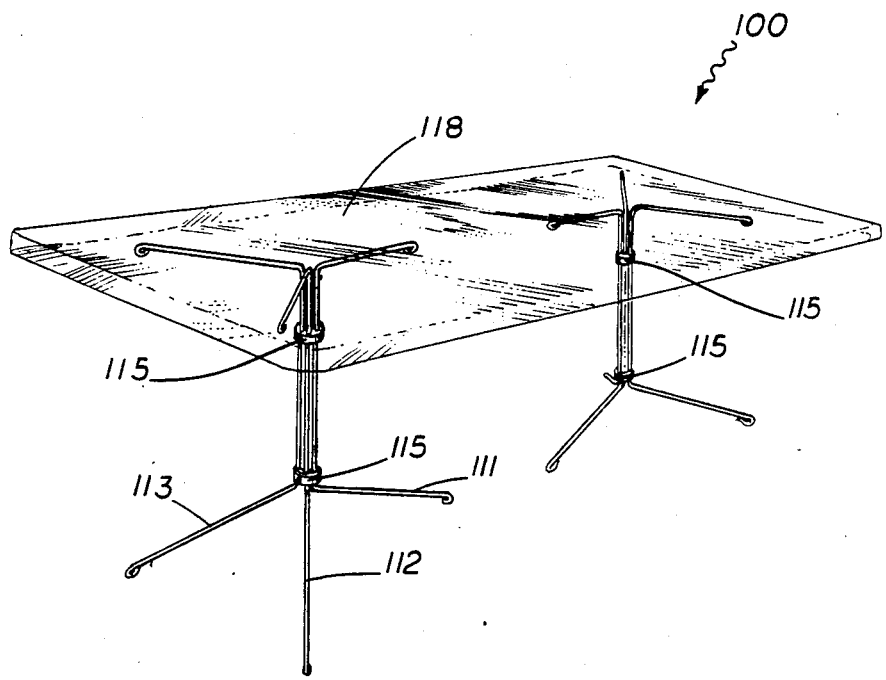
FIG. 5 is a perspective view of a transparent table top resting on two structures made in accordance with this invention.

In the table 100 illustrated in FIG. 5, the three rod members 111, 112, and 113 have generally vertical intermediate sections with outwardly bent lower portions and outwardly bent upper portions, all held together by sleeve and locking ring combinations 115 similar to those in FIGS. 1-4. In this example the transparent table top 118 rests on the outwardly bent upper portions of the rods. However, the upper portions can be variously arranged to mate with or register with appropriate indentations in a table top.

It should be noted that all the embodiments of this invention are readily assembled or dissembled and their components can be stored in a compact form prior to assembly or after disassembly.

I claim:

1. A support structure free of fastening members such as bolts, screws or the like and comprising in combination: a plurality of substantially identical bent stiff rod members and a plurality of pairs of a disc member and a locking ring member cooperable with said rods; each said rod member having a vertical intermediate portion terminating in an outwardly bent bottom portion; each said disc member having a plurality of outer notches which engage said vertical portions of said rod members, said ring members being positioned around said rods so as to firmly hold said rods against said notches in said disc members; the combination being characterized in that a lower pair of disc and ring members holds the bottom portions firmly in position so that they function as legs and another pair of disc and ring members holds the upper parts of said vertical sections of said rods firmly in position so as to hold a structure to be supported.

2. The combination of claim 1 wherein there are at least three rod members and the upper portions of said rod members are outwardly bent.

3. A plant stand made in accordance with claim 2 wherein the upper portions of the rods are L-shaped and a plant pan or the like is held within those portions.

4. The combination of the support structure of claim 1 and a table top.

5. The combination of the support structure of claim 2 and a table top.

* * * * *